Figure 1:
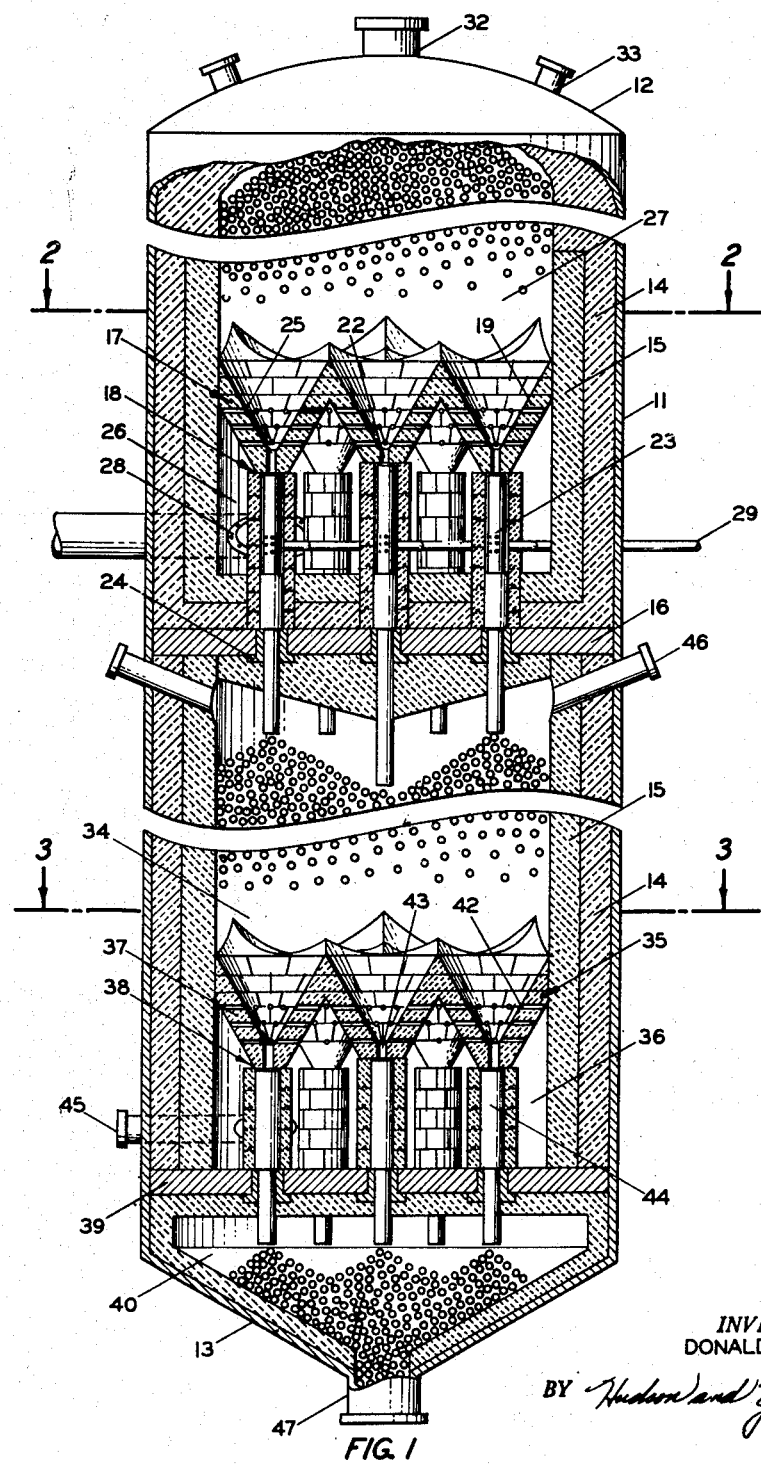

April 25, 1950 D. J. QUIGG 2,505,257
PEBBLE HEATER APPARATUS
Filed Jan. 5, 1948 2 Sheets-Sheet 1

INVENTOR.
DONALD J. QUIGG
BY Hudson and Young
ATTORNEYS

April 25, 1950   D. J. QUIGG   2,505,257
PEBBLE HEATER APPARATUS
Filed Jan. 5, 1948   2 Sheets-Sheet 2

INVENTOR.
DONALD J. QUIGG
BY *Hudson and Young*
ATTORNEYS

Patented Apr. 25, 1950

2,505,257

UNITED STATES PATENT OFFICE 2,505,257

PEBBLE HEATER APPARATUS

Donald J. Quigg, Bartlesville, Okla., assignor to Phillips Petroleum Company, a corporation of Delaware Application January 5, 1948, Serial No. 538

9 Claims. (Cl. 263—19)

This invention relates to pebble heater apparatus. In one of its more specific aspects it relates to improved pebble heater or regeneration chambers of pebble heater apparatus. In another of its more specific aspects it relates to improved gas heater chambers. In another of its more specific aspects it relates to means for removing stagnant pebble areas from pebble beds within pebble heater apparatus.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials furnishing heat thereto in a second direct heat exchange. The conventional pebble heater apparatus generally comprises two chambers which may be disposed in substantially vertical alignment. The solid heat exchange material is introduced into the upper portion of the first chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation furnishing heat for the treatment or conversion of the gaseous materials.

Conventional pebble heater chambers of pebble heater apparatus are generally formed as cylinders in which a solid heat exchange material is collected in the form of a moving bed. Hot heat exchange gases are sometimes introduced into the cylindrical bed at its lower periphery and are sometimes introduced through a refractory arch which supports the moving pebble bed. The solid heat exchange material is drawn from substantially a central point in the bottom of the bed and is passed downwardly into a gas heating chamber where a second moving bed of solid heat exchange material is formed. One disadvantage of conventional pebble heater chambers is that it is most difficult to establish uniform flow of uniformly heated solid heat exchange material from the pebble heating chamber to the gas heating chamber. In the withdrawal of solid heat exchange material from a substantially central point in the bottom of the pebble heating chamber the moving solid heat exchange material tends to form a cone. That material which is below and outside of the cone remains in what is substantially a stagnant area. At the same time when solid heat exchange material is introduced centrally into the upper portion of the pebble heating chamber the top of the solid heat exchange material forms an inverted cone extending downwardly and outwardly from the material inlet in the top of the chamber. It will thus be seen that the pebble bed is of lesser height at its periphery than at its axis because of the fact that the top of the pebble bed is formed in the shape of a cone. The hot gaseous heat exchange material which is introduced at the bottom of the solid bed seeks a path of least resistance upwardly through the solid material. Inasmuch as the bed is thinner at its outer periphery than at its axis the gas tends to channel through that material making up the periphery of the solid material bed, thus imparting heat to the material at the periphery while failing to raise the central portion of the solid material bed to the same temperature. The solid material which comes to rest in the stagnant areas, once raised to the temperature of the hot gaseous heat exchange material, fails to thereafter enter substantially into heat exchange relation with the hot gaseous material. It will thus be seen that the hot gaseous materials pass through an even thinner layer of solid material which will enter into a heat exchange relation therewith. For the reasons above described, large amounts of heat are lost by escape of the gaseous heat exchange material from the pebble heating chamber without its having imparted a maximum of its heat to the solid material bed.

Solid heat exchange material which is conventionally used in pebble heater apparatus is generally called "pebbles." The term "pebbles" as used herein denotes any solid refractory material of flowable size and form having strength, which is suitable to carry large amounts of heat from the pebble heating chamber to the gas heating chamber without rapid deterioration or substantial breaking. Pebbles conventionally used in pebble heater apparatus are substantially spherical in shape and range from about ⅛ inch to about 1 inch in diameter. In a high temperature process pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic as used in any selected process.

An object of the invention is to provide improved means for heating pebbles in pebble heater apparatus. Another object is to provide an improved method of flowing pebbles through a pebble heater chamber. Another object is to provide improved means for evenly heating pebbles in pebble heater chambers. Another object is to provide an improved method for heating pebbles in pebble heater apparatus. Another object is to reduce non-moving portions of pebble beds in pebble heater apparatus. Other and further objects and advantages will be apparent upon study of the accompanying discussion, the drawings and the claims.

Figure 2:
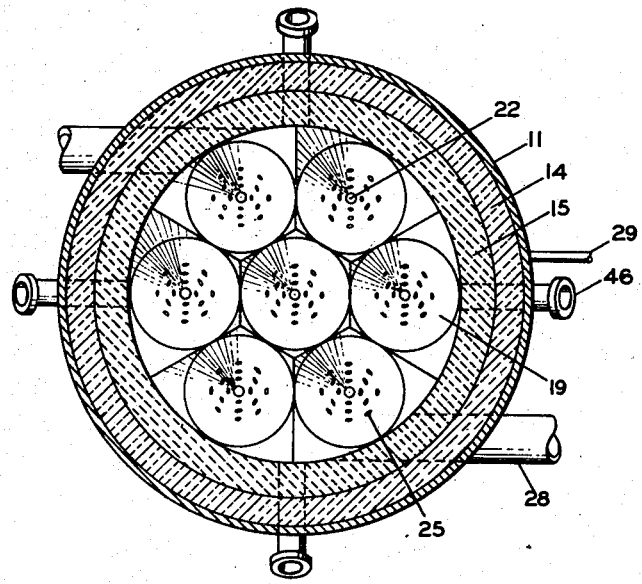
Figure 3:
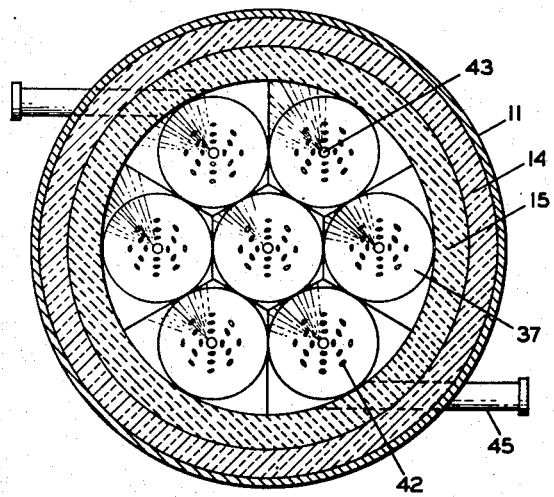
Figure 4:
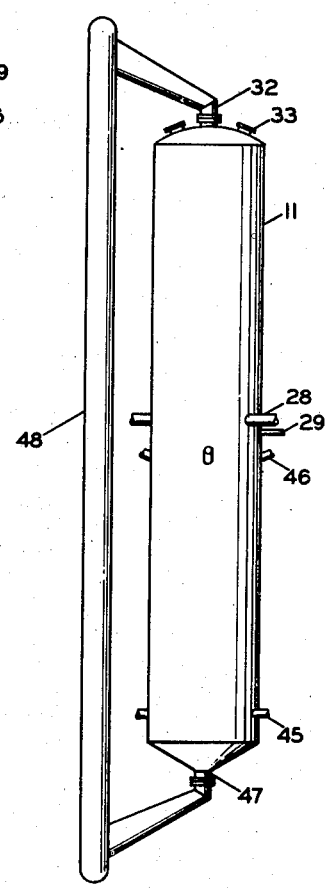

Understanding of the invention will be facilitated upon reference to the diagrammatic drawings in which Figure 1 is an elevation partially in section of pebble heater and gas heater chambers of a pebble heater apparatus embodying the invention. Figure 2 is a horizontal section taken along line 2—2 of Figure 1. Figure 3 is a horizontal section taken along line 3—3 of Figure 1. Figure 4 is a schematic view of a pebble heater apparatus.

In Figure 1 a pebble heater chamber and gas heater chamber are enclosed in closed outer shell 11 which is closed at its upper end by closure member 12 and at its lower end by closure member 13. The walls of shell 11 are lined with insulating means, which may include common refractory material 14, and super-refractory material 15 backed by common refractory material or other insulation backing material. Shell 11 is provided intermediate its ends with closure member 16 which may act as a bottom for a pebble heater chamber formed above closure member 16 and as a top for a gas heater chamber formed below closure member 16. As is obvious, the pebble heater and gas heater chambers could be formed in separate shells having separate tops and bottoms, but for the sake of compactness the single unit construction is preferred. Closure member 16 is protected on its upper and lower sides by layers of suitable insulation material. Closure member 17 is provided above closure 16, intermediate the ends of the pebble heater chamber and adapted so as to form a pebble heater zone above closure 17 and a combustion zone between closure 17 and insulated closure 16. Closure 17 is formed by joining the upper rims of the conical portions of funnel-shaped pebble outlet members 18. Funnel-shaped outlet members 18 are preferably constructed of a refractory material. The lower portion or the cylindrical sections of the funnels may be constructed of a plurality of rings of flat tapered bricks which bricks are provided with tongues on one flat side and grooves on the other so that said tongues and grooves may cooperate to hold one another in a coaxial position. The narrowest ends of the bricks are preferably concavely curved so as to form a smooth circular opening therethrough. The widest end of the bricks may be convexly rounded so as to form a cylindrical outer surface but that is not a necessity. It is also possible to form these sections of flat rings of refractory which are provided with cooperating tongues and grooves or other locking means for holding them in coaxial position. These refractory pieces may be fitted together so as to form cylindrical or tubular portions of funnel-shaped outlets 18. Conical-shaped portions 19 of funnel-shaped outlets 18 are preferably formed of refractory pieces or bricks described above which may be fitted together to form rings, which rings will have progressively larger diameters with each added layer above the tubular portions of outlets 18. The conical portions so formed may have an irregular surface but it is preferred that the inner ends of the tapered bricks should be so sloped from top to bottom that when fitted together they form cones having a relatively smooth inner surface. The closure is completed by placing caps on top of the rims of the conical portions which will close the open space left between those inverted cones. The caps are preferably provided with a central ridge from which they slope outwardly so as to form at least a modified continuation of the slope of the funnels. Refractory pieces are also provided in layers which extend between the insulation lining of shell 11 and the inverted cones so as to complete closure 17. The cylindrical portions of funnel-shaped outlet members 18 are preferably supported by closure member 16. Tubular openings which extend the length of the cylindrical portions of the funnel-shaped pebble outlets are preferably larger in diameter than pebble openings 22 in the apex of the inverted cone of such outlets and the tubular opening in the cylindrical portions and openings 22 are preferably coaxial. Pebble outlet conduits 23 extend upwardly from within the gas heater chamber through the closure member 16 and into funnel-shaped pebble outlets 18 to points preferably substantially adjacent the lower ends of the conical portions 19 of outlets 18. Conduits 23 may be provided intermediate their ends with downwardly faced shoulders on their outer surfaces which may be supported by contact with bushing members 24 which are slipped over the lower end of conduits 23 and are removably affixed, such as by threaded connections, to closure member 16. In that manner conduits 23 are maintained in position. The tubular opening extending through conduits 23 is preferably of substantially the same diameter as openings 22 in inverted conical portions 19. It is within the scope of the invention that conduits 23 may extend into and adjacent the tops of openings 22 thus allowing openings 22 to be of substantially the same size as the tubular openings extending the length of the cylindrical portions of the funnel-shaped outlets. Perforations 25 extend laterally from combustion zone 26 through conical portions 19 of outlets 18 so as to communicate between combustion zone 26 and pebble heater zone 27. Perforations 25 preferably extend in such direction that pebbles passing through outlets 18 will not pass outwardly through perforations 25. It is believed that perforations extending inwardly through the conical portions in a direction not above the horizontal to any possible angle below the horizontal, may be utilized. Burner means, such as burners 28, are provided so as to extend into combustion zone 26. It is preferred that burners 28 extend tangentially in the combustion zone. Fluid inlet conduit 29 is provided so as to extend through the wall of the chamber so as to communicate with the cylindrical portions of outlets 19. A section of conduits 23 should be perforate so that gaseous communication may be maintained between inlet 29 and the interior of conduits 23. Pebble inlet means, such as conduit 32, is provided in the upper portion of shell 11, preferably being substantially centrally located in closure member 12. Effluent outlet means, such as conduits 33, are provided in the upper portion of the pebble heater chamber, also preferably being located in closure member 12.

Conduits 23 should be of such length that they can extend downwardly from closure member 16 through its bottom insulation layer and a short distance into gas heating zone 34 so as to form an open space between the lower ends of conduits 23 and the lower insulation layer of closure 16. The insulation layer of closure 16 is preferably formed so that its lower surface is substantially that of an inverted cone. It is also preferred that those conduits 23 which are closer to the insulation wall within the gas heater chamber be shorter than those more centrally located in the chamber so that they too roughly follow the contour of an inverted cone. Closure member 35 is provided intermediate the ends of the gas heating chamber and is adapted so as to separate a gas distribution zone 36 below said closure member 35 from gas heater zone 34 above closure 35. Closure member 35 is similar in construction to closure member 17 in that it is formed by joining conical portions 37 of a plurality of funnel-shaped pebble outlets 38. Closure member 39 is provided in the gas heater chamber intermediate closure member 35 and closure member 13 so as to separate gas distribution zone 36 above closure member 39 from pebble collection zone 40 below closure member 39. The cylindrical portions of funnel-shaped outlet members 38 are preferably supported by closure member 39. Perforations 42 extend laterally from gas distribution zone 36 through conical portions 37 of funnel-shaped outlets 38 so as to communicate between gas distribution zone 36 and gas heating zone 34. Perforations 42 may extend similarly to perforations 25 so as to prevent pebbles from passing therethrough. The tubular openings within cylindrical portions of outlets 38 may be larger than openings 43 in the lower ends of inverted conical portions 37. Pebble outlet tubes 44 extend upwardly through closure member 39 into the tubular openings within cylindrical portions of outlets 38 to points substantially adjacent the lower ends of inverted conical sections 37. The opening which extends the length of outlet tubes 44 is preferably substantially the same diameter as openings 43 in portions 37 and is preferably substantially in vertical alignment therewith. Tubular outlets 44 should be spaced from closure member 13 so as to allow the flow of pebbles from outlets 44 into pebble collection zone 40. If openings 43 are of substantially the same diameter as the tubular openings through cylindrical portions of outlets 38 tubes 44 may extend to points adjacent the upper edges of openings 43. Closure 35 is preferably formed so that its general contour from the upper side is substantially concave. Gas inlet means, such as conduits 45 extend through the walls of the gas heater chamber and into gas distribution zone 36. Conduits 45 preferably extend tangentially into the gas distribution zone. Effluent outlet conduits 46 are provided in the upper portion of the gas heater chamber, preferably extending outwardly through the walls of the chamber from points within gas heater zone 34 and adjacent the insulation layer in the top of zone 34. The insulation walls of zone 34 may be so formed adjacent the effluent outlets as to direct effluent materials toward said outlets. Pebble outlet means, such as conduit 47, is provided in the lower portion of the gas heater chamber, preferably being centrally located in closure member 13. Closure member 13 is preferably shaped in the form of a hopper so as to direct pebbles within pebble collection zone 40 toward outlet conduit 47. Tubular conduits 44 may be secured in position similarly to pebble outlet conduits 23.

In the operation of the apparatus shown in Figures 1 and 4 of the drawings, pebbles are inserted into the pebble heater chamber in the upper portion of shell 11 through pebble inlet conduit 32. The pebbles may be distributed by any conventional pebble baffle so as to form a bed within pebble heater zone 27 which is of substantially uniform depth. The moving pebbles are converged by pebble converging zones formed by conical portions 19. Pebbles pass by gravity flow through pebble heater zone 27 and contiguously flow from zone 27 through the pebble converging zones and through pebble outlet conduits 23. The pebbles fill the gas heater chamber so as to form a contiguous pebble bed from pebble converging zones at the lower extremity of gas heater zone 34 through conduits 23, pebble converging zones at the lower extremity of pebble heater zone 27, and upwardly a substantial distance into the pebble heater zone. If a pebble surge chamber is utilized outside of the pebble heater chamber the pebble bed may be maintained so as to fill the pebble heater zone to substantially the lower end of pebble inlet conduit 32 or the lower edge of the pebble baffle means. If, however, a pebble surge chamber is not utilized it will be desirable to maintain a space between the top of the pebble bed and the top of the pebble heater chamber so as to allow for surging of the pebbles. Combustible materials are injected into combustion zone 26 through burners 28 and are burned thereby. Resulting combustion gases are distributed within the combustion zone and pass upwardly therein and laterally from the combustion zone into the pebble converging zones where they contact the downflowing pebbles just before the pebbles pass out of the pebble heater zone. The combustion gases then pass upwardly through the moving pebble bed and out of the pebble heater chamber through effluent outlets 33. Gaseous materials to be treated or reacted are injected into the gas heater chamber through fluid inlet conduits 45 and are distributed in gas distribution zone 36. The gases pass upwardly in zone 36 and laterally from the distribution zone through perforations 42 into the pebble converging zones and upwardly through the hot pebble bed where the reaction or treatment takes place. The effluent materials are removed from gas heater zone 34 through effluent outlet conduits 46. A gas which is inert to the process being carried on within the pebble heater apparatus is injected through fluid inlet conduit 29 and thus into pebble outlet conduits 23 thereby forming a choke means which substantially prevents the passage of combustion gas downwardly therethrough into the gas heater zone or the passage of reaction material upwardly through conduits 23 into the pebble heater zone 27. Pebbles are removed from gas heater zone 34 through the pebble converging zones at the lower extremity of gas heater zone and are collected in pebble collection zone 40. Pebbles are withdrawn from pebble collection zone 40 through outlet conduit 47 and are conveyed by means of elevating apparatus 48 to a point above the pebble heater chamber and are passed to the upper portion of the pebble heater chamber through pebble inlet conduit 32.

It has been determined that at least a certain minimum pebble bed depth should be maintained above a constricted outlet in order to obtain a zone of substantially uniform pebble flow. That depth is approximately 1.5 times the diameter of the chamber served by the outlet. This has been verified by determining that the angle of slip, which is the term applied to the angle taken from a horizontal line passing through the inlet to the pebble outlet beneath which pebbles will be substantially stagnant and above which pebbles are substantially all flowing, is approximately 70°. This angle intersects a cylindrical chamber about a centrally located outlet at a point about 1.4 times the diameter of the chamber above the level of the pebble outlet.

In order to obtain the most uniform heating it is desirable to have the smallest possible ratio of the height of the stagnant pebble bed to the height of uniformly flowing pebble bed. This has been accomplished by the instant invention by forming the closure member at the bottom of the heater zones in the shape of a plurality of inverted cones which form portions of funnel-shaped pebble outlets. The angle formed within the inverted cone portions is preferably between 100° and 60°. By forming the bottom of the pebble bed in this manner stagnant portions of the pebble bed are substantially eliminated. Heating gases are caused to contact the flowing pebbles immediately before they pass from the pebble heating zone downwardly into the gas heating zone. The gases then pass upwardly through the balance of the pebble bed, which is uniformly flowing, in heat exchange with the pebbles therein, heating those pebbles until the pebbles arrive at the outlet point where they are caused to contact the gases at the highest temperatures.

This invention provides an improved gas heater zone by forming the bottom thereof in a substantially concave shape. The top of the pebble bed in the gas heater zone is also formed in a substantially concave shape by pebble conduits of varying lengths. These conduits cause a depression in the center of the pebble bed and a substantially annular ridge beneath the outer pebble conduits. By forming the top of the pebble bed and the bottom of the bed in this manner the distance traveled by the reaction gases passing through the bed will be substantially equal for all portions of the gas passing therethrough. This necessarily provides more uniform reaction products.

The diameter of the openings in the bottom of the inverted conical portions and through the outlets should be approximately 7 to 8 times the diameter of the pebbles. By maintaining this proportion of outlet diameter to pebble diameter, bridging of the pebbles within the pebble outlets is prevented. The funnel-shaped pebble outlets are preferably so arranged that the outer edges of the upper portions of the conical portions are tangential to one another. Ridged caps may then be supplied to close the space between the cones. By properly ridging these caps, pebbles are directed into the funnel-shaped pebble outlets thus removing possible dead space for the collection of stagnant pebbles. The caps substantially extend the inner surfaces of the inner cones until such inner surfaces substantially intersect. Six outlets arranged symmetrically on a circle having a radius two-thirds that of the radius of the chamber will be tangent each other, the wall of the chamber, and a centrally located seventh outlet at substantially the same level. Layers of refractory material used to close the openings between the cones and the outer wall of the chamber build up the outer portion of the closure so as to complete a substantially concave arch in both the pebble heater and gas heater chambers. The inner surface formed by these layers should also be sloped so as to furnish a smooth sloping surface for the direction of pebbles. The number of pebble outlets may depend upon the compactness desired for the pebble heater apparatus. A smaller number of outlets than seven may be utilized but such construction would necessitate a greater depth of the conical portions of the funnel-shaped outlets. The pebble bed depth should be maintained at at least 1.5 times the diameter of the cylinder or container served by the pebble outlet. Maintenance of such a bed depth assures even flow of the pebbles in the bed and prevents "sinking" of the center of the bed. The diameter of the upper rim of the conical portion of the funnel-shaped pebble outlets is substantially the size of the imaginary chamber served by each pebble outlet. It will thus be seen that as the number of pebble outlets is decreased the depth of the chamber will necessarily have to be increased because of the necessity for greater vertical space for the conical portions of the concave arch to become tangent and the greater depth of pebble bed necessary above the entrance to the conical portions of the arch so as to maintain a pebble bed at least 1.5 times the diameter of the chamber served by each outlet. It is obvious that a greater number of pebble outlets than seven may be used.

One advantage of the structure of the pebble heater apparatus of this invention is that no separation means is required to separate the pebbles from the supporting arch. With this type apparatus, substantially the only materials supported on the arch are pebbles which are continuously moving therethrough. For that reason the strength of the apparatus need not be as great as those requiring separation means, such as aggregate material to prevent pebbles from falling through gas outlet perforations of the supporting member and which also must support those pebbles forming that portion of the pebble bed below the angle of slip.

As will be evident to those skilled in the art, various modifications of this invention can be made or followed in the light of the foregoing disclosure and discussion without departing from the spirit or scope of the disclosure or from the scope of the claims.

I claim:

1. In pebble heater apparatus utilizing a moving bed of pebbles, an improved pebble heater chamber comprising a substantially vertically disposed closed outer shell; insulating means within and adapted so as to insulate said shell; pebble inlet means and effluent outlet means in the upper portion of said shell; a closure member within the chamber formed by said shell and adapted so as to divide said chamber into a pebble heater zone above and a combustion zone below said closure member, said closure member being formed by joining the upper rims of conical portions of a plurality of funnel-shaped pebble outlets which are supported by the closed bottom of said shell; perforations, extending laterally from said combustion zone through said conical portions of said funnel-shaped outlets, communicating between said combustion zone and said pebble heater zone; pebble outlet conduits extending upwardly through the bottom of said shell into said funnel-shaped pebble outlets; and burner means extending into said combustion zone.

2. The pebble heater chamber of claim 1, wherein said perforations extend substantially horizontally through said conical portions of said funnel-shaped pebble outlets.

3. The pebble heater chamber of claim 1, wherein each said funnel-shaped pebble outlet comprises a plurality of layers of axially aligned rings of flat tapered bricks which are concavely curved at their inner ends so as to form a smooth circular opening therethrough, said rings in the conical portion of said outlets being progressively larger in diameter from the lower conical portion to its upper end and the inner surface of said progressively larger diameter rings sloping downwardly and inwardly so as to form smooth surfaced conical portions of said funnel-shaped pebble outlets.

4. The pebble heater chamber of claim 3, wherein spaces between said funnel-shaped outlets are closed by plates which slope from a central ridge downwardly so as to form at least a modified continuation of the slope of said funnel-shaped outlets; and said perforations extend laterally through said conical portions from said combustion zone to said pebble heater zone in a direction not above the horizontal.

5. Pebble heater apparatus comprising in combination a substantially vertically disposed closed outer shell; a first closure member disposed intermediate the ends of said shell so as to form a pebble heater chamber above said closure member and a gas heater chamber below said closure; insulation means within said shell adapted so as to insulate the walls of said chambers; a second closure member disposed within said pebble heater chamber and adapted so as to divide said pebble heater chamber into a pebble heater zone above and a combustion zone below said second closure member, said second closure member being formed by joining the upper rims of conical portions of a plurality of funnel-shaped pebble outlets which are supported on said first closure member; perforations, extending laterally from said combustion zone through said conical portions of said funnel-shaped pebble outlets, communicating between said combustion zone and said pebble heater zone; pebble outlet conduits extending upwardly from within said gas heater chamber through said first closure member into said funnel-shaped outlets so as to communicate between said pebble heater zone and said gas heater chamber; burner means extending into said combustion zone; pebble inlet means and effluent outlet means in the upper portion of said shell; a third closure member disposed within said gas heater chamber and adapted so as to divide said gas heater chamber into a gas heater zone above and a gas distribution zone below said third closure member, said third closure member being formed by joining the upper rims of conical portions of a plurality of funnel-shaped pebble outlets; a fourth closure member disposed within said gas heater chamber intermediate said third closure member and the bottom of said shell and adapted so as to limit said gas distribution zone below said third closure member, form a pebble collection zone below said fourth closure member, and support said funnel-shaped outlets of said third closure member; pebble outlet tubes extending upwardly through said fourth closure into the funnel-shaped outlets of said third closure member so as to communicate between said gas heater zone and said pebble collection zone; perforations extending laterally from said gas distribution zone through said conical portions of said funnel-shaped outlets of said third closure member so as to communicate between said gas distribution zone and said gas heater zone; effluent outlet means in the upper portion of said gas heater chamber; pebble outlet means in the bottom of said shell below said fourth closure member; and gas inlet means extending into said gas distribution zone.

6. The apparatus of claim 5, wherein said second and third closure members are substantially concave arches.

7. The apparatus of claim 5, wherein said burner means extends tangentially into said combustion zone.

8. The apparatus of claim 5, wherein said pebble outlet conduits extend downwardly into said gas heating zone for a short distance, the conduits nearer said shell extending a shorter distance than more centrally located conduits.

9. The apparatus of claim 5, wherein said effluent outlets from said gas heater chamber extend laterally from the space which is contained within said gas heater zone above the lower ends of said pebble outlet conduits and below said first closure member.

DONALD J. QUIGG.

REFERENCES CITED

The following references are of record in the file of this patent:

UNITED STATES PATENTS

| Number | Name | Date |
|---|---|---|
| 731,682 | Hellig | June 23, 1903 |
| 2,398,954 | Odell | Apr. 23, 1946 |
| 2,412,136 | Evans et al. | Dec. 3, 1946 |

FOREIGN PATENTS

| Number | Country | Date |
|---|---|---|
| 10,460 | Germany | Sept. 28, 1880 |